(12) United States Patent
Mankhand et al.

(10) Patent No.: US 9,547,515 B2
(45) Date of Patent: Jan. 17, 2017

(54) CONVERT A GESTURE (75) Inventors: Shubham Mankhand, Fremont, CA (US); Richard Alden Bramley, Jr., Mansfield, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 39 days.

(21) Appl. No.: 14/416,722

(22) PCT Filed: Jul. 25, 2012

(86) PCT No.: PCT/IN2012/000517
§ 371 (c)(1),
(2), (4) Date: Jan. 23, 2015

(87) PCT Pub. No.: WO2014/016845
PCT Pub. Date: Jan. 30, 2014

(65) Prior Publication Data
US 2015/0268983 A1  Sep. 24, 2015

(51) Int. Cl.
G06F 9/455 (2006.01)
G06F 3/0488 (2013.01)
G06F 3/01 (2006.01)

(52) U.S. Cl.
CPC ........... *G06F 9/45558* (2013.01); *G06F 3/017* (2013.01); *G06F 3/04883* (2013.01); *G06F 2009/45579* (2013.01)

(58) Field of Classification Search
None
See application file for complete search history.

(56) References Cited

U.S. PATENT DOCUMENTS

| 7,454,756 | B2 | 11/2008 | Lantz et al. |
| 7,644,407 | B2* | 1/2010 | Cowperthwaite ... G06F 9/45558 711/203 |
| 7,665,077 | B2 | 2/2010 | Mariani et al. |
| 7,886,304 | B1 | 2/2011 | Blaukopf et al. |
| 8,018,892 | B1 | 9/2011 | Chen et al. |
| 2006/0200821 | A1* | 9/2006 | Cherkasova ........ G06F 11/3423 718/1 |
| 2007/0143482 | A1* | 6/2007 | Zancho ............. H04M 1/72563 709/227 |
| 2007/0300223 | A1* | 12/2007 | Liu ........................ G06F 9/5077 718/1 |

(Continued)

FOREIGN PATENT DOCUMENTS

| CN | 1604576 A | 4/2005 |
| CN | 101594299 A | 12/2009 |
| WO | WO 01/50282 | 12/2001 |

OTHER PUBLICATIONS

Sugerman, Jeremy, Ganesh Venkitachalam, and Beng-Hong Lim. "http://www.vmware.com/pdf/usenix_io_devices.pdf." VMWare. N.p., Jun. 30, 2001. Web. Apr. 30, 2016. <http://www.vmware.com/pdf/usenix_io_devices.pdf>.*

(Continued)

*Primary Examiner* — Wei Zhen
*Assistant Examiner* — Binh Luu
(74) *Attorney, Agent, or Firm* — HP Patent Department (57) ABSTRACT A profile store can include a guest profile. A converter can be in the control domain. The converter can convert a gesture detected on a touch input device to a domain input for the guest domain. The guest profile for the guest domain can be used for the conversion.

18 Claims, 5 Drawing Sheets

(56) References Cited

U.S. PATENT DOCUMENTS

| | | | |
|---|---|---|---|
| 2010/0265183 A1* | 10/2010 | Mail | G06F 3/0238 |
| | | | 345/168 |
| 2010/0318990 A1 | 12/2010 | Hou et al. | |
| 2011/0055846 A1 | 3/2011 | Perez et al. | |
| 2011/0113426 A1 | 5/2011 | Kung et al. | |
| 2011/0202918 A1* | 8/2011 | Park | G06F 9/45541 |
| | | | 718/1 |
| 2011/0298701 A1* | 12/2011 | Holzer | G06Q 90/00 |
| | | | 345/156 |
| 2012/0089980 A1* | 4/2012 | Sharp | G06F 9/45558 |
| | | | 718/1 |
| 2014/0109091 A1* | 4/2014 | Philipson | G06F 9/4445 |
| | | | 718/1 |

OTHER PUBLICATIONS

Noboru Iwamatsu : "Paravirtualized USB Support for Xen" Jan. 1, 2008 (Jan. 1, 2008), pp. 1-12, XP065093759.

International Search Report and Written Opinion received in PCT Application No. PCT/IN2012/000517, mailed on May 2, 2013, 11 pg.

European Patent Office, Extended Search Report for EP Appl. No. 12881542.0 dated Feb. 24, 2016 (9 pages).

* cited by examiner

CONVERT A GESTURE

BACKGROUND

A computing device can include a hypervisor also known as a virtual machine manager. The hypervisor presents to the guest operating systems a virtual operating platform and manages the execution of the guest domains. A hypervisor is a hardware virtualization technique to allow multiple operating systems, termed guests domains, to run concurrently on a computing device.

BRIEF DESCRIPTION OF THE DRAWINGS

Some embodiments of the invention are described with respect to the following figures.

DETAILED DESCRIPTION

In order to enable a better user experience the concept of 'gestures' has evolved. The user performs a series of standard actions on the hardware input device which when taken together and in order are interpreted as a specific gesture. For example, if you slide your finger in a specific area of some touchpads it is interpreted as a scroll gesture. The data from the series of standard actions on the hardware input device is sent to the driver where the gesture interpretation occurs.

A hypervisor implementation converts input data from any source into a basic set of instructions that are the same for all guest domains, for example, standard keyboard scan codes for keyboards and a series of PS/2 mouse movements for mouse type device. A hypervisor may not be able to communicate the data that it receives from a hardware input device to a guest domain in a way that is usable to the guest domain. The data may not be usable if the guest domain does not include drivers for the input device since that is where the data gets interpreted as a gesture. In an example of a hypervisor implementation the hypervisor exposes a PS/2 mouse to the guest domains which means the guest will not load a driver for the real input device. If the guest domain has not loaded a driver for the specific input device it is unlikely that the guest domain will understand that the data it is receiving corresponds to a gesture. There may be gesture detecting hardware that is part of the touch screen or touchpad and identifies the gesture as a gesture in the hardware or the data generated by the touchscreen or touchpad is interpreted as a gesture by the device driver or another component.

For a gesture to be received and understood by a guest domain the hardware may have to be virtualized within the domain. In the previous example, the touch screen or touchpad may be virtualized within the guest domain. This would require that the virtualized hardware be present in every domain so that each domain could execute the instructions that the gesture was intended to invoke. Virtualizing the hardware in each domain uses resources, such as memory and cpu time, that could be used for other tasks.

A guest domain may have an interface for receiving commands through other input sources such as keyboards and mice. For example a guest domain may be able to receive all the inputs from a qwerty keyboard or a two button mouse with a scroll wheel. The qwerty keyboard may be for example a 101 key keyboard and the mouse may be for example a PS/2 compatible mouse. The guest domain may support shortcut keys to perform functions in the guest domain without the use of a user interface menu. For example to bold text in a word processor executing on an operating system a user may enter the ctrl and B keys together rather than open the font menu using a mouse and then click on the icon to bold the text. In a drawing program the ctrl and + keys together zoom in and the ctrl and − key together zooms out. The mouse scroll wheel can scroll the data on the screen up or down. Input devices other than the qwerty keyboard and two button mouse may be able to recognize gestures, for example a touchpad or touch screen may be able to recognize that if two fingers are used on the touchpad that the data on the display is scrolled to another part of the data. Since the guest domain does not have a way to input the two finger gesture it has to be mapped to an instruction that the guest domain does understand such as movement of the scroll wheel of the mouse. Also if two fingers are used to pinch or open the gesture may be mapped to the keyboard shortcut for zoom in and zoom out.

In one implementation, a computing device includes an input device and a hypervisor to manage a virtualized environment. The computing device can also include a first guest domain and a control domain. A profile store can include a first guest profile. A domain switcher can configure the state of the input device based on the contents of the profile corresponding to the guest domain. A converter, in the control domain, can convert a gesture detected on an input device to a domain input for the guest domain from the profile or the guest domain.

In one implementation, a method of receiving gestures from an input device can include receiving a gesture, by a device driver in a control domain, from the input device. The gesture can be converted in a control domain, to a domain input determined by a first guest profile associated with a first guest domain. The profile specific input can be sent to an input driver in a first guest domain determined by a domain switcher.

Figure 1:
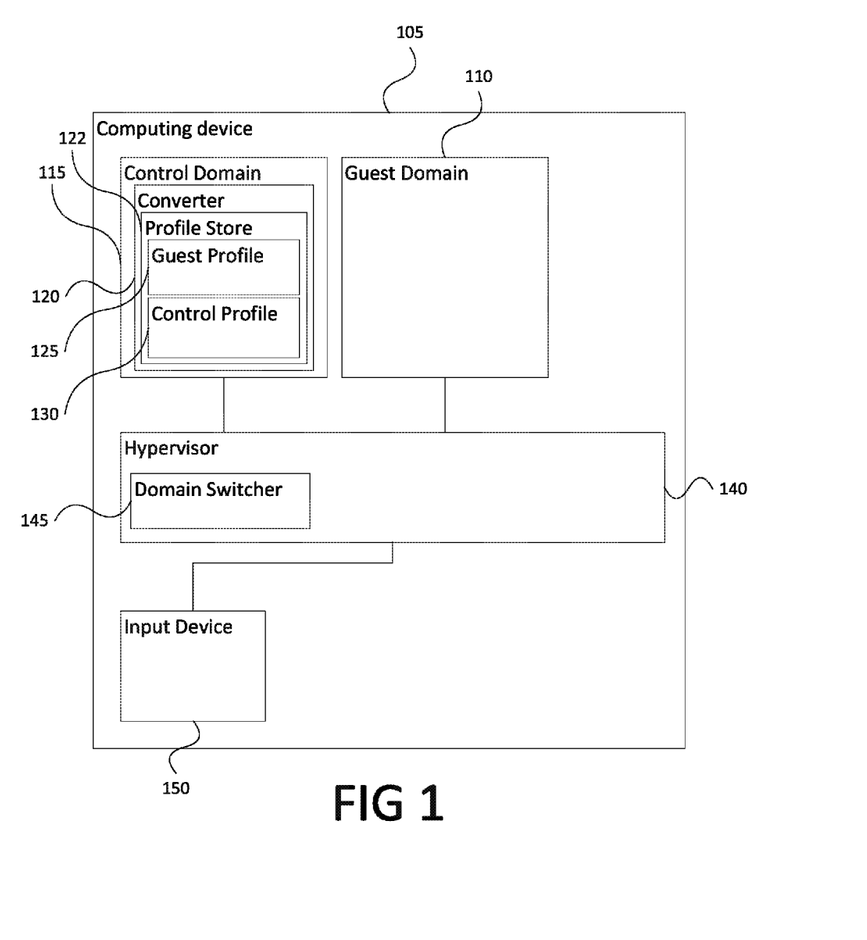
FIG. 1 is a block diagram of a computing device including a virtualized environment according to an example implementation.

FIG. 1 is a block diagram of a computing device including a virtualized environment according to an example implementation. A computing device 105 includes an input device 150 and a hypervisor 140 to manage a virtualized environment. The computing device 105 can also include a guest domain 110 and a control domain 115. A profile store 122 can include a guest profile 125 and a control profile 130. A domain switcher 145 can configure the state of the input device 150 based on the contents of the guest profile 125 corresponding to the guest domain 110. A converter 120, in the control domain 115, can convert a gesture detected on an input device 150 to a domain input for the guest domain 110 based on the guest profile 130 for the guest domain 110 from the profile store 122.

If the control domain is selected by the domain switcher 145 then the converter 120 can convert a gesture detected on an input device to a domain input for the control domain 115 based on the control profile 130 in the profile store 122.

Figure 2:
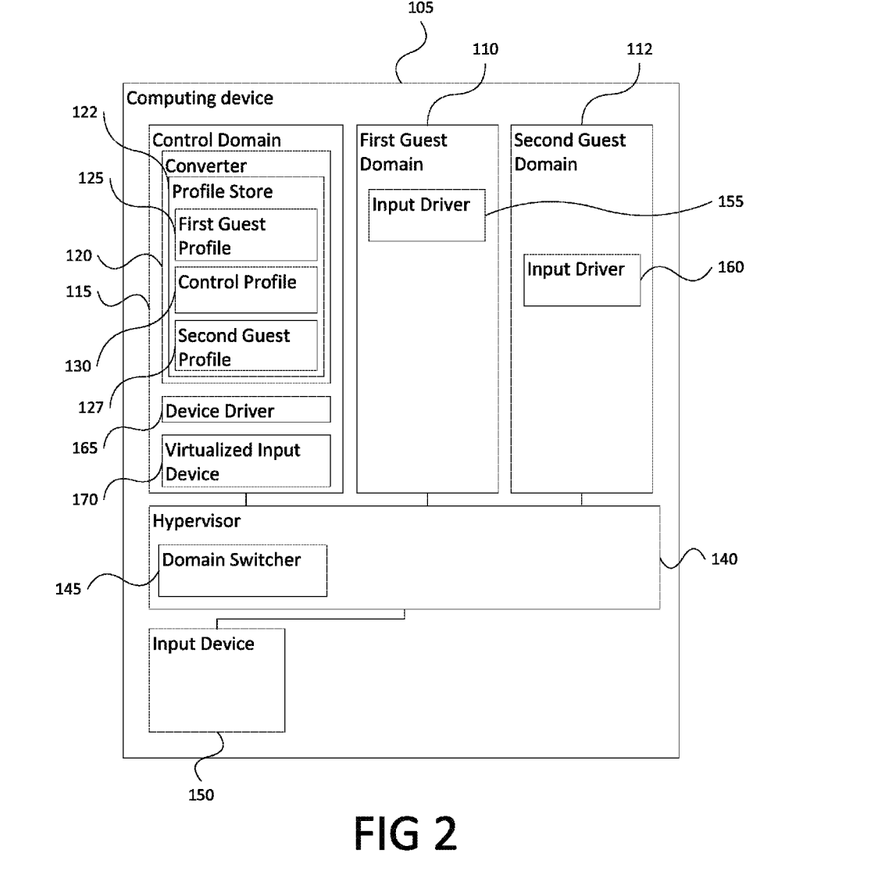
FIG. 2 is a block diagram of a computing device including a virtualized environment according to an example implementation.

FIG. 2 is a block diagram of a computing device including a virtualized environment according to an example implementation. The first guest domain 110 can include an input driver 155 and a second guest domain can include an input driver 160. For the purpose of explanation numbers are added to the guest domains and guest profiles when there is more than one guest domain and guest profile. The input drivers 155 and 160 may be the same or may be different drivers. Whether the input drivers in different domains are different may be dependent on the operating system of the domain. The input drivers 155 and 160 may be drivers for a qwerty keyboard, a generic mouse or another input device. When a guest domain is created a guest profile such as the first guest profile 125, second guest profile 127 or the control profile 130 can be created. The profile includes data that maps a domain input to a gesture. A domain input is an input that would be understood by the input drivers of a guest domain such as input drivers 155 or 160.

The profile for a domain may be generated in different ways. For example in one implementation the input driver for a domain may send a list of domain inputs to the profile store in the control domain. In addition, the control domain may also receive a list of gestures from a device or device driver. The list of gestures from the device or device driver can be matched up with the list of domain inputs from the input driver. For example the input driver or an operating system of the guest domain may provide a domain input and a domain action list such as those in the right two columns in table A. The operating system or an application may provide a list of shortcuts such as keyboard shortcuts to the profile to be mapped to gestures. The device driver may provide the device input gesture and the device action such as those in the left of columns of table A. The domain profile may match the device action with the domain action see table A. The converter can use a table like table A to match a device input gesture to the domain input. Table A includes some examples of gestures and domain inputs but more are possible. The profile table, such as table A may be provided by the domain, by the hypervisor, downloaded from the web, provided by the device driver, or may be obtained in another way as well.

TABLE A

| Device input Gesture | Device Action | Domain Action | Domain Input |
|---|---|---|---|
| Two fingers moving up on the input device | Scroll up | Scroll up | Mouse wheel Up |
| Two fingers moving down on the input device | Scroll down | Scroll down | Mouse wheel Down |
| Two fingers moving up on the input device | Scroll up | Scroll up | Keyboard page up |
| Two fingers moving down on the input device | Scroll down | Scroll down | Keyboard page down |
| Move two finger away from each other | Zoom in | Zoom in | Keyboard Ctrl and Mouse wheel up |
| Move two fingers toward each other | Zoom out | Zoom out | Keyboard Ctrl and Mouse wheel down |
| Move two finger away from each other | Zoom in | Zoom in | Keyboard Ctrl and Keyboard + |
| Move two fingers toward each other | Zoom out | Zoom out | Keyboard Ctrl and Keyboard – |
| Rotate two fingers clockwise | Rotate Clockwise | Rotate Clockwise | Keyboard Ctrl, Keyboard Alt, Keyboard Right arrow |
| Rotate two fingers counter clockwise | Rotate Counter Clockwise | Rotate Counter Clockwise | Keyboard Ctrl Keyboard Alt, Keyboard Left arrow |

The domain switcher 145 switches between the domains such as the first guest domain 110, the second guest domain 112 and the control domain. If one of the domains is selected, the domain switcher causes the profile for that domain to be applied to a received gesture. In some implementations the device driver 165, the domain switcher 145 or another component may determine if the input from the input device is a gesture and cause the converter to apply the profile for that domain to the input. For example if the input from the input device 150 is an input that is recognized by the input driver 155 or 160 of the first guest domain 110 or second guest domain 112 then the input may be sent to input driver 155 or 160 based on the domain switcher 145 without being sent to the converter 120. Such as if the input is to move the cursor up then the input driver 155 or 160 may recognize that input as a mouse input that moves the cursor up and a converter 120 is not used to apply the profile to the input before it is passed to the input driver 155 or 160 of the first guest domain 110 or the second guest domain 112.

The domain switcher may also stop the flow of data from the input device to the domain when the domain is not selected or if the data from the input device is a gesture that would not be recognized until it is converted. The domain switcher may save the state of the input device to the profile area corresponding to a selected domain. Saving the state can allow the domain switcher to select a different domain and then return to a previously selected domain and retrieve the saved state. An example of the saved state information may be for example Touchpad Lock/Unlock status or touchpad illumination status. The domain switcher may start the flow of data from the input device to the selected domain, for example if the domain switcher causes a new domain to be selected then the domain switcher may pause the data from the input device until the new domain is selected.

If switching from one domain to another, for example from the control domain to the first guest domain or from the first guest domain to the second guest domain, the settings from the selected domain are applied to the input device through the device driver. For example the first guest domain may have a cursor speed setting that is different than the cursor speed setting in the second guest domain such that the cursor moves faster when the domain switcher selects the first guest domain than when the domain switcher selects the second guest domain if the speed setting in the first guest domain is faster than the speed setting in the second guest domain for the input device.

In one example, if the first guest domain 110 is selected by the domain switcher 145 then that domain would receive input data from the input device 150. If the domain switcher 145 switches to the second guest domain 112 then the domain switcher 145 may cause the data to stop going to the first guest domain, the domain switcher 145 may cause the state of the input device to be saved to the first guest profile 125, the domain switcher may then start the flow of data to the second guest domain 112.

A domain such as the control domain 115 may include a device driver 165. The device driver is an interface between the input device 150 hardware and the domain software. The device driver 165 can detect a gesture based on data received from the input device 150. For example the data from the input device 150 may show two inputs moving away from each other, the device driver 165 would detect that data from the input device 150 as a gesture such as for zooming in. The device driver 165 can then send the gesture information to the converter 120. The converter 120 can apply a profile to the gesture received from the device driver 165. For example the first guest profile 125 may be applied to the gesture by the converter if the first guest domain 110 is selected by the domain switcher 145. The first guest profile 125 may map the gesture to a domain input that is recognized by the input driver, for example if the gesture is zoom in then the profile may cause the converter to create a domain input to the input driver 155 that of the first guest domain such as a control key (ctrl) and a mouse scroll wheel up which the input driver causes to zooms in on the data displayed by the first guest domain 110 on a display.

The hardware input device 150 may have hardware such as a built in controller, for example an application specific integrated circuit (ASIC), that includes gesture reporting to determine if a gesture has been input to the input device 150 and report the input as a gesture. The hardware input device 150 can then output the gesture directly to the device driver 165 or to the converter 120. If the input device 150 includes the gesture reporting hardware, virtualizing the input device 150 in the domains can use more resources than if the hardware of the input device did not have gesture reporting hardware. Fewer resources may be used if the input device 150 includes the gesture reporting hardware and the input device does not have to be virtualized in a domain as a virtualized input device 170.

Figure 3:
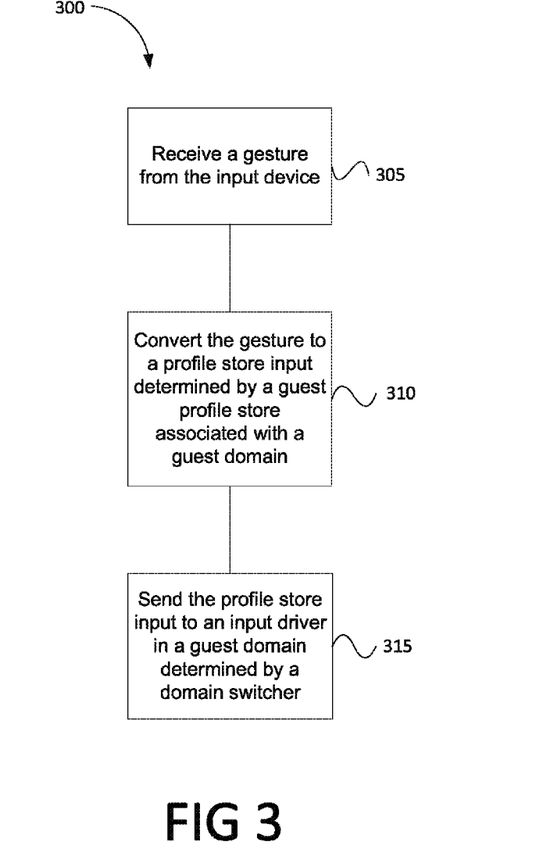
FIG. 3 is a flow diagram of a method of receiving gestures from an input device according to an example implementation.

FIG. 3 is a flow diagram of a method of receiving gestures from an input device according to an example implementation. The method 300 includes a device driver in a control domain to receive a gesture from the input device at 305. The device driver may be for example device driver 165. The control domain may be for example control domain 115. The input device may be input device 150. The gesture may be data from the input device that the device driver recognizes as a gesture.

A control domain can include a converter to convert the gesture to a domain input determined by a guest profile associated with a guest domain at 310. The converter may be converter 120. The guest profile can be the guest profile 125 and the guest domain can be guest domain 110. The guest profile can include a map of gestures to domain inputs.

The domain input can be sent to an input driver in a guest domain determined by a domain switcher at 315. The domain input is an input that can be recognized by the input driver of a guest domain. If there are one or more domains in a system, the domain switcher selects the profile, based on the selected domain, used by the converter to generate domain input and then directs the domain input to the selected domain.

Figure 4:
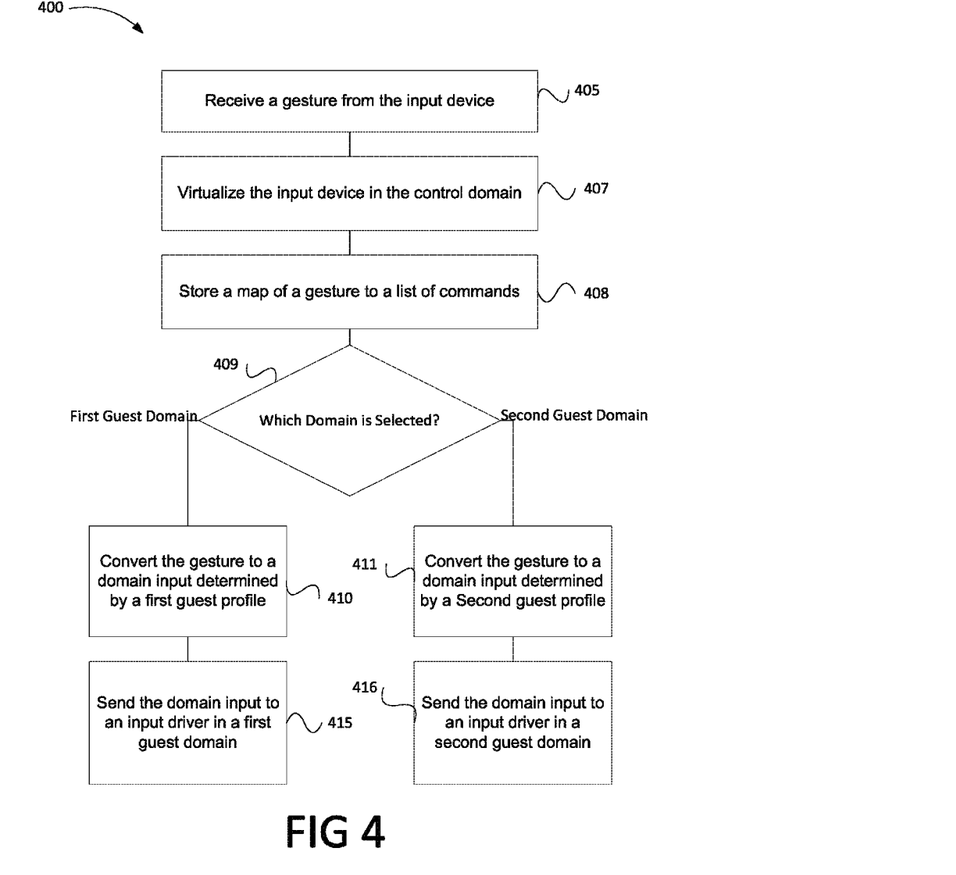
FIG. 4 is a flow diagram of a method of receiving gestures from an input device according to an example implementation.

FIG. 4 is a flow diagram of a method of receiving gestures from an input device according to an example implementation. The method 400 includes a device driver in a control domain to receive a gesture from the input device at 405.

A profile store can store the profiles from a domain. For example a first guest domain can have an associated first guest profile that is stored in the profile store at 408. The first guest profile is a mapping of gestures to domain inputs. Additionally for the guest domains such as the second guest domain a second map of a gesture to a domain input for the second domain can be stored in the second guest profile in the profile store.

The domain that is selected can be determined at 409. For example if the first domain is selected the method proceeds to 410. The gesture can be converted to a domain input by a converter at 410. The converter at 410 applies the first guest profile since the first guest domain was selected by the domain switcher. The domain input is sent to the input driver in the first guest domain at 415. If the domain switcher selects the second guest domain then the method proceeds to 411. The gesture can be converted to a domain input by a converter at 411. The converter at 411 applies the second guest profile since the second guest domain was selected by the domain switcher. The domain input is sent to the input driver in the second guest domain at 416.

Figure 5:
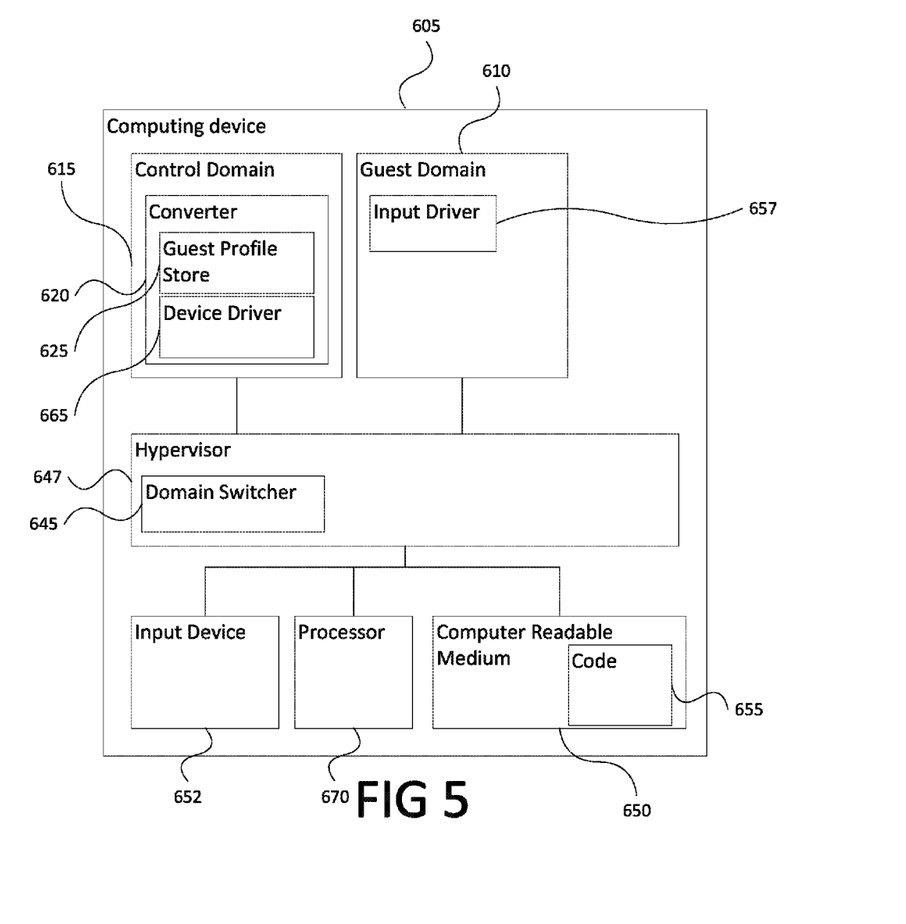
FIG. 5 is a computing system including a computer readable medium according to an example implementation.

FIG. 5 is a computing system including a computer readable medium according to an example implementation. The non-transitory computer readable medium 650 can include code 655 that if executed by a processor in a computing device 605 causes the processor 670 to receive a gesture from the input device 652. The input device 652 can send the gesture to the device driver 665 in the control domain 615.

The converter 620 can convert the gesture to a domain input. The conversion can be determined by a guest profile 625 associated with a guest domain 610. The processor 670 can send the domain input to an input driver 657 in a guest domain, such as the guest domain as determined by a domain switcher 645 in the hypervisor 647. The processor may also store a map of a gesture to a domain input for the guest domain in the guest profile in the profile store 625.

The techniques described above may be embodied in a computer-readable medium for configuring a computing system to execute the method. The computer readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and various types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computer device comprising:
    an input device of a first type;
    a hypervisor to manage a virtualized environment;
    a first guest domain and a second guest domain;
    a control domain;
    a profile store including a first guest profile and a second guest profile, the first guest profile mapping different gestures made with the input device to respective different domain inputs for an input driver in the first guest domain, the input driver being for a second type of input device different from the first type, and the second guest domain comprising a second input driver for a type of input device different from the first type, and the second guest profile mapping different gestures made with the input device to respective different domain inputs for the second input driver;

a processor; and a non-transitory storage medium storing converter instructions executable on the processor to, in the control domain, convert a detected gesture made using the input device to a given domain input for the input driver in the first guest domain, the given domain input selected from the different domain inputs in the first guest profile based on matching the detected gesture to one of the different gestures in the first guest profile.

2. The computer device of claim 1, further comprising domain switcher instructions executable on the processor to switch between the first guest domain and the second guest domain.

3. The computer device of claim 1, wherein the input driver in the first guest domain is to receive the given domain input from the converter instructions.

4. The computer device of claim 3, wherein the first guest domain is without a driver for the first type of input device.

5. The computer device of claim 1, further comprising domain switching instructions executable on the processor to select one of the first and second guest profiles to apply to a gesture made using the input device according to which of the first and second guest domains is selected.

6. The computer device of claim 5, wherein the domain switching instructions are executable on the processor to, in response to switching from the first guest domain to the second guest domain:
stop a flow of data corresponding to a gesture made using the input device to the first guest domain, and
start a flow of data corresponding to a gesture made using the input device to the second guest domain.

7. The computer device of claim 6, wherein the domain switching instructions are executable on the processor to:
in response to switching from the first guest domain to the second guest domain, save a state of the input device to a specified storage location for the first guest domain, and
retrieve the saved state of the input device in response to switching from the second guest domain to the first guest domain.

8. The computer device of claim 1, further comprising:
a device driver in the control domain to detect the gesture made using the input device and to provide gesture information corresponding to the detected gesture to the converter instructions, wherein the converter instructions are executable on the processor to convert the gesture information to the given domain input, and wherein the input driver in the first guest domain is unable to use the gesture information without the converting applied by the converter instructions.

9. The computer device of claim 1, wherein the input device or a device driver for the input device is to send a list of the different gestures in the first guest profile to the control domain, the control domain to map the different gestures in the list to the different domain inputs in the first guest profile.

10. The computer device of claim 9, wherein the input driver in the first guest domain or an operating system is to provide a list of the different domain inputs in the first guest profile to the control domain.

11. A method comprising:
detecting, by a device driver in a control domain, a given gesture made using an input device of a first type;
converting, by a converter in the control domain, the given gesture to a given domain input using a first guest profile associated with a first guest domain, the first guest profile mapping different gestures made with the input device to respective different domain inputs for an input driver in the first guest domain, the input driver being for a second type of input device different from the first type;
sending, from the control domain, the given domain input to the input driver in the first guest domain;
switching from the first guest domain to a second guest domain that includes a second input driver for an input device of a type different from the first type; and
responsive to the switching, selecting, by the control domain, a second guest profile to apply to a gesture made using the input device and detected by the device driver, the second guest profile mapping different gestures made with the input device to respective different domain inputs for the second input driver.

12. The method of claim 11, further comprising virtualizing the input device in the control domain.

13. The method of claim 11, wherein the first guest domain is without a driver for the first type of input device.

14. The method of claim 11, further comprising:
providing, by the device driver in the control domain, gesture information corresponding to the given gesture to the converter, wherein the converter converts the gesture information to the given domain input, and wherein the input driver in the first guest domain is unable to use the gesture information without the converting applied by the converter.

15. The method of claim 11, further comprising:
in response to the switching, applying a setting of the second guest domain rather than a setting of the first guest domain to the input device.

16. A non-transitory computer readable medium comprising code that upon execution cause a computer to:
receive a detected user input from an input device of a first type;
determine that a first guest domain of a plurality of guest domains is selected;
convert the detected user input to a given domain input determined by a first guest profile associated with the first guest domain, the first guest profile mapping different user inputs made with the input device to respective different domain inputs for an input driver in the first guest domain, the input driver being for a second type of input device different from the first type, the given domain input selected from the different domain inputs in the first guest profile based on matching the detected user input to one of the different user inputs in the first guest profile;
send the given domain input to the input driver in the first guest domain; and
provide a second guest domain and a second guest profile, the second guest domain comprising a second input driver for a type of input device different from the first type, and the second guest profile mapping different gestures made with the input device to respective different domain inputs for the second input driver.

17. The non-transitory computer readable medium of claim 16, wherein the first guest domain is without a driver for the first type of input device.

18. The non-transitory computer readable medium of claim 17, wherein the instructions upon execution cause the computer to:
detect, by a device driver, the detected user input;
output, by the device driver, user input information for the detected user input,
wherein the converting comprises converting the user input information output by the device driver to the given domain input, and wherein the input driver in the first guest domain is unable to use the user input information without the converting.

* * * * *